US012722710B2

(12) United States Patent
Lee et al.

(10) Patent No.: US 12,722,710 B2
(45) Date of Patent: Sep. 1, 2026

(54) VEHICLE BODY

(71) Applicant: POSCO CO., LTD, Pohang-si (KR)

(72) Inventors: Hong-Woo Lee, Incheon (KR); Jaehyun Kim, Incheon (KR); Dong-Yoon Seok, Seoul (KR)

(73) Assignee: POSCO CO., LTD, Pohang-si (KR)

( * ) Notice: Subject to any disclaimer, the term of this patent is extended or adjusted under 35 U.S.C. 154(b) by 368 days.

(21) Appl. No.: 18/287,785

(22) PCT Filed: Apr. 26, 2022

(86) PCT No.: PCT/KR2022/005942
§ 371 (c)(1),
(2) Date: Oct. 20, 2023

(87) PCT Pub. No.: WO2022/234999
PCT Pub. Date: Nov. 10, 2022

(65) Prior Publication Data

US 2024/0182116 A1 Jun. 6, 2024

(30) Foreign Application Priority Data

May 7, 2021 (KR) ........................ 10-2021-0059017

(51) Int. Cl.
*B62D 25/02* (2006.01)
*B62D 21/03* (2006.01)
(Continued)

(52) U.S. Cl.
CPC ........... *B62D 25/025* (2013.01); *B62D 21/03* (2013.01); *B62D 21/157* (2013.01);
(Continued)

(58) Field of Classification Search
CPC .. B62D 25/025; B62D 25/2036; B62D 25/20; B62D 21/157; B62D 21/03; B62D 29/00
(Continued)

(56) References Cited

U.S. PATENT DOCUMENTS 5,613,727 A 3/1997 Yamazaki
5,921,618 A 7/1999 Mori et al.
(Continued)

FOREIGN PATENT DOCUMENTS

CA 3139260 A1 11/2020
CN 101913380 A 12/2010
(Continued)

OTHER PUBLICATIONS

Extended European Search Report dated Oct. 16, 2024, issued in corresponding European Patent Application No. 22799042.1.
(Continued)

*Primary Examiner* — Amy R Weisberg
*Assistant Examiner* — Denise L. Esquivel
(74) *Attorney, Agent, or Firm* — Morgan Lewis & Bockius LLP

(57) ABSTRACT

A vehicle body may include: a side sill extending in the lengthwise direction of a vehicle; and a cross member extending in the widthwise direction of the vehicle and coupled at an end thereof to the side sill, wherein: the side sill comprises an inner panel, an outer panel coupled to the inner panel, an outer panel coupled to the inner panel, and a reinforcement member disposed between the inner panel and the outer panel; the inner panel includes an inclined surface formed to have an ascending slope from the inner side to the outer side of the vehicle; the end of the cross member is formed to have a slope corresponding to the inclined surface and is coupled to the outer surface of the inclined surface; and one end of the reinforcement member is coupled to the inner surface of the inclined surface.

11 Claims, 4 Drawing Sheets

(51) Int. Cl.

| | |
|---|---|
| ***B62D 21/15*** | (2006.01) |
| ***B62D 25/20*** | (2006.01) |
| ***B62D 27/02*** | (2006.01) |
| ***B62D 29/00*** | (2006.01) |

(52) U.S. Cl.
CPC ......... *B62D 25/2036* (2013.01); *B62D 27/02* (2013.01); *B62D 29/008* (2013.01)

(58) Field of Classification Search
USPC ... 296/187.12, 146.1, 146.6, 193.05, 203.03, 296/209, 187.08, 193.07, 204
See application file for complete search history.

(56) References Cited

U.S. PATENT DOCUMENTS

| | | | | |
|---|---|---|---|---|
| 8,308,227 | B2 | 11/2012 | Tsuruta et al. | |
| 10,286,956 | B2 | 5/2019 | Keuthage et al. | |
| 10,513,295 | B2 | 12/2019 | Takahashi | |
| 10,723,391 | B2 | 7/2020 | Saeki et al. | |
| 11,661,111 | B2 * | 5/2023 | Kuipers | B62D 21/157 296/209 |
| 2009/0146457 | A1 | 6/2009 | Kanagai et al. | |
| 2010/0237659 | A1 | 9/2010 | Ishigame et al. | |
| 2013/0049405 | A1 | 2/2013 | Kurogi et al. | |
| 2013/0229030 | A1 | 9/2013 | Yamaguchi et al. | |
| 2015/0166120 | A1 | 6/2015 | Han et al. | |
| 2016/0229456 | A1 * | 8/2016 | Boettcher | B62D 27/026 |
| 2016/0280282 | A1 | 9/2016 | Nishimura et al. | |
| 2019/0193790 | A1 | 6/2019 | Choi et al. | |
| 2019/0276095 | A1 | 9/2019 | Lam et al. | |
| 2020/0140017 | A1 | 5/2020 | Schuppert et al. | |
| 2020/0282816 | A1 | 9/2020 | Matsuda et al. | |
| 2021/0220896 | A1 | 7/2021 | Shirakami et al. | |
| 2022/0348268 | A1 * | 11/2022 | Okesaku | B62D 25/2036 |
| 2022/0388574 | A1 * | 12/2022 | Galceran Oms | C21D 9/0068 |
| 2023/0159107 | A1 * | 5/2023 | Matecki | B62D 21/15 296/209 |

FOREIGN PATENT DOCUMENTS

| | | | |
|---|---|---|---|
| CN | 111661171 | A | 9/2020 |
| EP | 2336007 | B1 | 9/2013 |
| EP | 3554923 | B1 | 2/2021 |
| EP | 3805078 | A1 | 4/2021 |
| JP | H11-208520 | A | 8/1999 |
| JP | 2005-067445 | A | 3/2005 |
| JP | 2007-210367 | A | 8/2007 |
| JP | 2013-049376 | A | 3/2013 |
| JP | 2016-141289 | A | 8/2016 |
| JP | 6225653 | B2 | 11/2017 |
| KR | 10-1997-0041760 | A | 7/1997 |
| KR | 10-1482462 | B1 | 1/2015 |
| KR | 10-1526397 | B1 | 6/2015 |
| KR | 10-1776489 | B1 | 9/2017 |
| KR | 10-2019-0029954 | A | 3/2019 |
| KR | 10-2019-0068592 | A | 6/2019 |
| KR | 10-2021-0036182 | A | 4/2021 |
| WO | 2012/063393 | A1 | 5/2012 |
| WO | 2015/053125 | A1 | 4/2015 |
| WO | 2019/216317 | A1 | 11/2019 |
| WO | 2020/225766 | A1 | 11/2020 |
| WO | 2021/060660 | A1 | 4/2021 |

OTHER PUBLICATIONS

Office Action dated Oct. 29, 2024, issued in corresponding Japanese Patent Application No. 2023-565598.

International Search Report dated Aug. 9, 2022, issued in International Patent Application No. PCT/KR2022/005942 (with English translation).

Japanese Office Action dated Mar. 4, 2025 issued in Japanese Patent Application No. 2023-565598 (with English translation).

* cited by examiner

VEHICLE BODY

CROSS-REFERENCE OF RELATED APPLICATIONS

This application is the U.S. National Phase under 35 U.S.C. § 371 of International Patent Application No. PCT/KR2022/005942, filed on Apr. 26, 2022, which in turn claims the benefit of Korean Application No. 10-2021-0059017, filed on May 7, 2021, the disclosures of which applications are incorporated by reference herein.

TECHNICAL FIELD

The present disclosure relates to a vehicle body capable of improving response performance in a side collision of a vehicle.

BACKGROUND ART

To protect against impacts exerted on a side surface of a vehicle, a vehicle body includes a side sill and a cross member. Among the cross members, for example, a seat cross member is a member for fixing a frame of a seat, but may also perform a role of supporting a collision load exerted on the side surface thereof.

In the case of mounting a high-capacity battery such as an electric vehicle, or the like, a space below a floor should be secured to be as wide as possible. In this case, an installation space for a member capable of absorbing collision energy is insufficient, making it vulnerable to side collisions.

In order to solve this problem, a reinforcing member is additionally introduced into the side sill to improve energy absorption and at the same time, by reinforcing the cross member, an amount of inflow into a room of the side sill is suppressed as much as possible.

Therefore, it is necessary to secure a reinforced connection structure of a side sill and a cross member connected to the side sill. In particular, when applying ultra-high strength steel of, for example, 780 MPa or more, a shape of the connection structure between the cross member and the side sill is inevitably very limited due to low formability.

(Patent Document 1) JP Hei 11-208520 A

SUMMARY OF INVENTION

Technical Problem

An aspect of the present disclosure is to provide a vehicle body capable of minimizing penetration of a collision load into a passenger space and a battery space during a side collision of a vehicle by improving a connection structure between a side sill and a cross member.

Solution to Problem

According to an aspect of the present disclosure, a vehicle body includes: a side sill extending in a lengthwise direction of a vehicle; and a cross member extending in a widthwise direction of the vehicle, an end thereof being coupled to the side sill, wherein the side sill includes an inner panel, an outer panel coupled to the inner panel, an outer panel coupled to the inner panel, and a reinforcing member disposed between the inner panel and the outer panel, the inner panel includes an inclined surface formed to have an ascending slope from an inner side to an outer side of the vehicle, and the end of the cross member is formed to have a slope corresponding to the inclined surface and is coupled to an outer surface of the inclined surface, and one end of the reinforcing member is coupled to an inner surface of the inclined surface.

Advantageous Effects of Invention

As set forth above, according to the present disclosure, during a side collision of a vehicle, energy may be absorbed by a side sill and a reinforcing member therein, and a load may be directly transmitted to the cross member through the reinforcing member, thereby minimizing penetration of collision load into a passenger space and a battery space.

In addition, according to the present disclosure, by strengthening a connection structure between the side sill and the cross member, the cross member can receive and support a high load during a side collision of the vehicle, and eventually obtain an effect of increasing rigidity of the vehicle body.

Furthermore, according to the present disclosure, when manufacturing a cross member with, for example, 780 MPa or more of ultra-high strength steel, a flange of an end portion may be formed without notches due to the inclined shape of the end portion, and a weight of the vehicle body, can be reduced.

MODE FOR INVENTION

Figure 1:
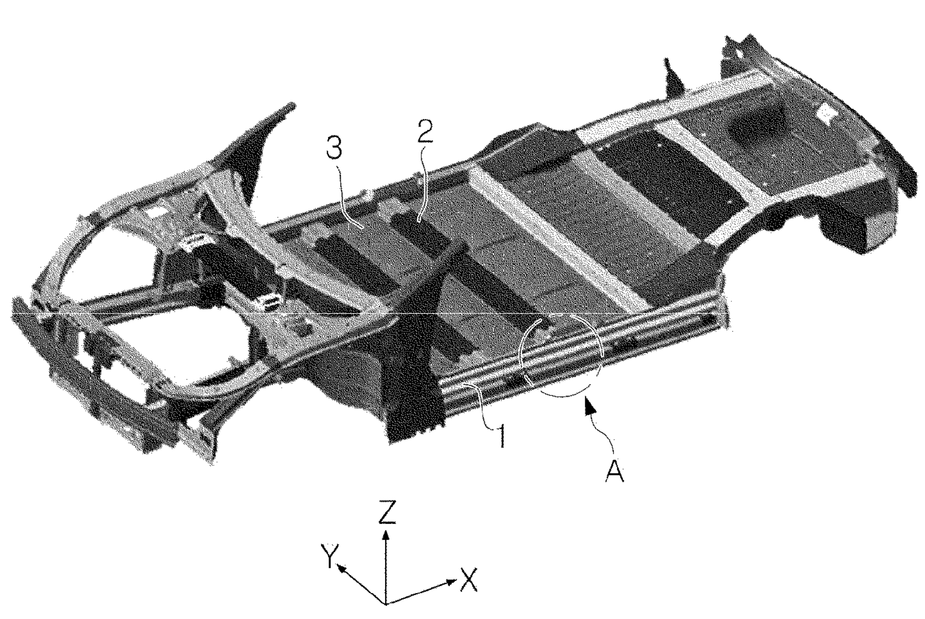
FIG. 1 is a perspective view illustrating a vehicle body according to an embodiment of the present disclosure.

An aspect of the present disclosure is to provide a vehicle body that can not only effectively support a collision load exerted on a side surface of a vehicle, but also increase connection rigidity and reduce the weight, by proposing an organic connection relationship between a side sill, a cross member, and a reinforcing member inside the side sill.

Hereinafter, the present disclosure is explained in detail through exemplary drawings. In adding reference numerals to the components of each drawing, it should be noted that the same components have the same numerals as much as possible even if they are displayed on different drawings.

Terms used in relation to directions in the description below include "front", "side", "rear", "front", "back", "above", "below", "left and right", "inner", "outer", "inner side", "outer side", and the like are defined based on the vehicle or vehicle body.

In the present specification, a vehicle refers to various vehicles for moving an object to be transported, such as people, animals, objects, or the like, from a starting point to a destination. These vehicles are not limited to those that drive on roads or tracks.

Figure 2:
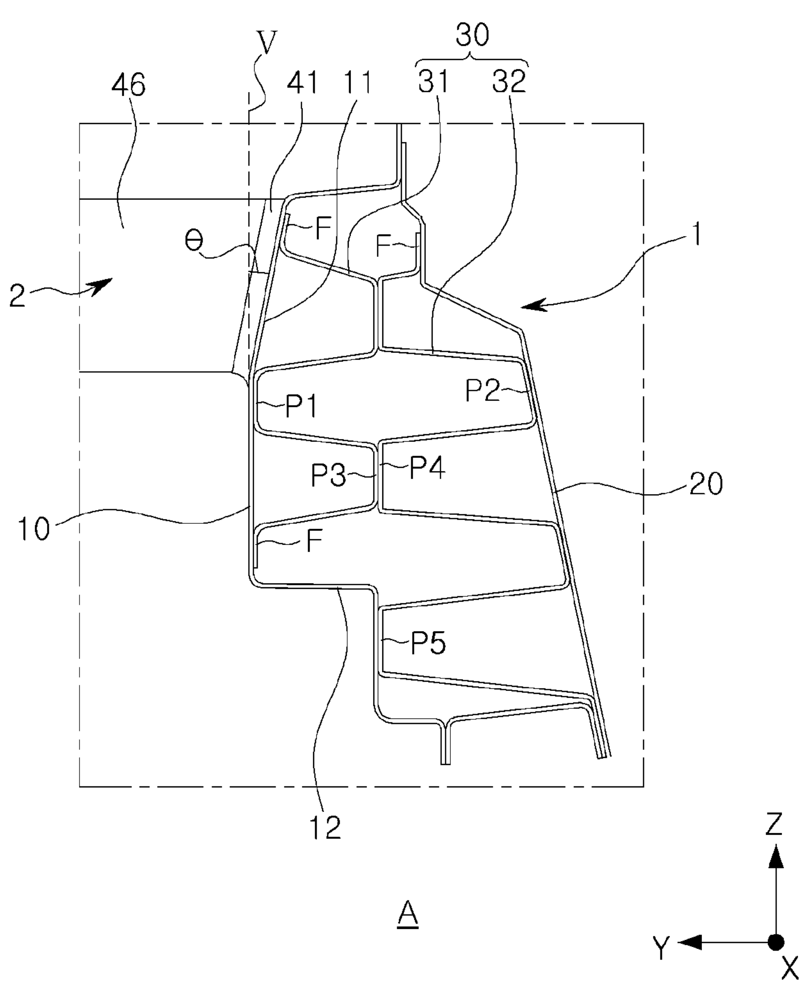
FIG. 2 is an enlarged cross-sectional view of portion A of FIG. 1.
Figure 3:
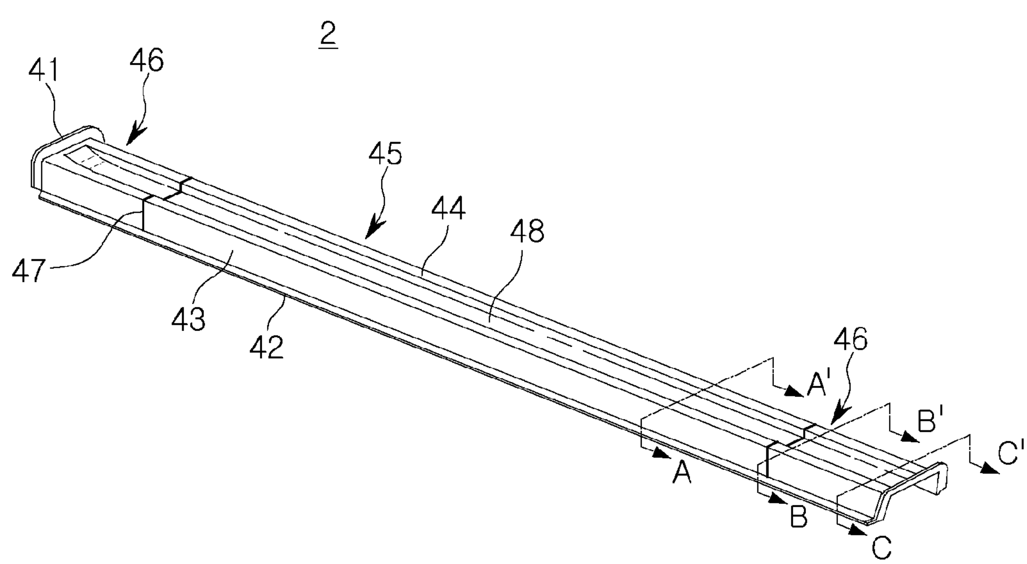
FIG. 3 is an enlarged perspective view of the cross member illustrated in FIG. 1.

FIG. 1 is a perspective view illustrating a vehicle body according to an embodiment of the present disclosure. FIG. 2 is an enlarged cross-sectional view of part A of FIG. 1, and FIG. 3 is an enlarged perspective view of a cross member illustrated in FIG. 1.

A skeletal structure of the vehicle body may include a side member extending in a lengthwise direction (X) of the vehicle and forming a side surface of the vehicle body, and a plurality of cross members extending in a widthwise direction (Y) of the vehicle and coupled to both side members.

The plurality of cross members may be coupled to a side member at intervals from each other from a front end to a rear end of the vehicle body, and among the plurality of cross members 2, for example, a seat cross member may be used to fix a frame of a seat.

The side member may include a side sill 1 protecting a passenger space in a side collision and forming an exterior of a side of the vehicle.

As described above, the vehicle body has a shape in which a plurality of members are crossed and coupled in a lengthwise direction (X) and widthwise direction (Y) of the vehicle. Depending on connection rigidity between the crossed members, energy transmitted during a collision is evenly distributed throughout the vehicle body or, on the contrary, is broken, resulting in serious deformation and damage with the concentration of the collision energy, resulting in serious injury to passengers.

Accordingly, the connection rigidity between the crossed members becomes a very important factor in securing the overall rigidity of the vehicle body and the safety of passenger.

For example, a battery case (not shown) may be mounted in the middle of the vehicle body. To this end, a battery space in which a battery case is mounted may be provided in the vehicle body. The battery case may include a plurality of battery cells capable of charging and discharging.

Above the battery case, a floor panel 3 partitioning a passenger space in which passengers board may be installed. A plurality of cross members 2, such as seat cross members for example, can be fixed to the floor panel.

As illustrated in FIGS. 1 and 2, a vehicle body according to an embodiment of the present disclosure may include a side sill 1 and a cross member 2.

The side sill 1 may be formed and disposed to extend from both lower left and right sides of the vehicle body along a longitudinal direction X of the vehicle.

For example, the side sill 1 may include an inner panel 10 and an outer panel 20, and the inner panel and the outer panel may be welded to each other in a lower end portion or an upper end portion of the side sill, so that the side sill may be integrally coupled. The inner panel may be coupled to a floor panel 3, so that the side sill may be installed on the vehicle body.

The side sill 1 may be formed of, for example, a metal material such as steel, and may be formed by forming using a press, bending, roll forming, or a combination thereof.

In the side sill 1, collision performance of the side sill may be secured by adjusting a material of a sheet material forming the side sill and a strength or thickness of the material. For example, by employing ultra-high strength steel of 780 MPa or more, an optimal combination for reducing a weight of the side sill can be achieved.

More specifically, the side sill 1 may be formed of a sheet material such as 1470 Martensitic (MART) steel or 1470 Hot Press Forming (HPF) steel having a thickness of about 1.4 mm to 1.6 mm produced by the present applicant.

Here, 1470 MART steel is a type of steel having a tensile strength of 1,470 MPa or more and a yield strength of 1,050 MPa or more, to improve collision safety, and 1470 HPF steel is a type of steel that has a tensile strength of 1,470 MPa or more and at the same time, and can freely form shape of parts while obtaining a tensile strength of 1,470 MPa or more.

The inner panel 10 may include an inclined surface 11 formed so that an inclination thereof increases from an inside to an outside. The inclined surface may be formed in a position higher than half the height of the inner panel. The inclined surface may be inclined at an angle θ of about 8 to 20 degrees with respect to a vertical line V extending in the height direction Z of the vehicle.

In addition, the inner panel 10 may include a stepped portion 12 extending from the inside to the outside and is bent. The stepped portion may be formed in a position lower than half the height of the inner panel.

The side sill 1 serves as an important body structure for responding to front, rear and side collisions of a vehicle. Optionally, since buckling easily occurs in various collision conditions when an inside of the side sill is empty, various types of reinforcing means may be supplemented inside the side sill.

A side sill 1 of a vehicle body according to an embodiment of the present disclosure include a reinforcing member 30 disposed between an inner panel 10 and an outer panel 20. For example, the reinforcing member may be formed by bending a single sheet material.

After repeating a method of being extended to a predetermined length and then bent, to form a desired number of flat surfaces, both ends of the sheet material may be bent clockwise or counterclockwise, respectively, to form a flange.

One end portion of the reinforcing member 30, that is, an upper flange may be coupled to an inner surface of the inclined surface 11 formed on the inner panel 10. The upper flange may be coupled to the inner surface of the inclined surface by welding such as spot welding, laser welding, or arc welding using carbon dioxide.

The other end portion of the reinforcing member 30, that is, a lower flange, may be coupled to an inner surface of the inner panel 10. The lower flange may be coupled to the inner surface of the inner panel by welding such as spot welding, laser welding, or arc welding using carbon dioxide.

The remaining flat surfaces of the reinforcing member 30 in contact with the inner panel 10 or the outer panel 20 may be fixed by adhesive, welding, or the like.

The reinforcing member 30 may be formed of, for example, a metal material such as steel, and may be formed by forming or bending using a press, roll forming, or a combination thereof.

The reinforcing member 30 may be formed of a sheet material such as 1180 transformation induced plasticity (TRIP) steel having a thickness of about 0.9 mm to 1.1 mm produced by the present applicant.

Here, the 1180 TRIP steel is a type of steel having improved elongation while guaranteeing a tensile strength of 1180 MPa or more and a yield strength of 850 MPa or more.

The reinforcing member 30 may include a first reinforcing member 31 coupled to the inner panel 10 and a second reinforcing member 32 coupled to the outer panel 20. As illustrated in FIG. 2, each of the first reinforcing member and the second reinforcing member may be formed by meanderingly bending a single sheet material.

After repeating a method of extended to a predetermined length and then bent to form a desired number of flat surfaces, both ends of the sheet material may be bent clockwise or counterclockwise, respectively, to form a flange.

The first reinforcing member 31 and the second reinforcing member 32 may have a length sufficient to almost fill an inside of the side sill 1 in the longitudinal direction X of the vehicle.

By having a shape in which the first reinforcing member 31 and the second reinforcing member 32 are bent several times, it is possible to secure not only collision energy acting on a side of the side sill 1, but also rigidity against collision energy acting in front and rear directions.

The first reinforcing member 31 and the second reinforcing member 32 may partially be into contact with each other and be fixed. To this end, the first reinforcing member and the second reinforcing member may have a length in the width direction Y of the vehicle capable of bisecting a space between the inner panel 10 and the outer panel 20.

In addition, a contact surface on which the first reinforcing member 31 and the second reinforcing member 32 are in contact with each other may be located to extend to be parallel to a vertical line V extending in the height direction Z of the vehicle so that the collision load therebetween can be accurately transmitted and responded thereto.

A flat surface P1 and a flange F of the first reinforcing member 31 may be coupled to the inner panel 10 by welding such as spot welding, laser welding, or arc welding using carbon dioxide. Accordingly, a welding portion may be formed between the flat surface P1 and the flange.

One end of the first reinforcing member 31, that is, the upper flange F may be coupled to an inner surface of the inclined surface 11 formed on the inner panel 10.

The other end of the first reinforcing member 31, that is, the lower flange F may be coupled to an inner surface of the inner panel 10.

A flat surface P2 and a flange F of the second reinforcing member 32 may be coupled to the inner panel 10 by welding such as spot welding, laser welding, or arc welding using carbon dioxide. Accordingly, a welding portion may be formed between the flat surface P2 and the flange.

In addition, when the first reinforcing member 31 and the second reinforcing member 32 are in contact with each other, an adhesive may be interposed between a flat surface P3 of the first reinforcing member and a flat surface P4 of the second reinforcing member and bonded to each other, so that an adhesive portion may be formed.

In addition, a flat surface P5 of the second reinforcing member 32 may be fixed to a wall surface extending in the height direction Z of the vehicle from the stepped portion 12 of the inner panel 10. To this end, an adhesive may be interposed between the flat surface P5 of the second reinforcing member and the wall surface of the stepped portion to be bonded to each other.

The reinforcing member constructed and disposed as described above may accurately transfer the collision load received by the outer panel 20 of the side sill 1 to the inner panel 10, and then to the cross member 2.

The cross member 2 may be formed and disposed to extend in a width direction Y of the vehicle and connect the side sills 1 on both sides.

The cross member 2 may be coupled to one side surface of the side sill 1. More specifically, an end of the cross member may be formed to be inclined to correspond to an inclined surface 11 of the inner panel 10 of the side sill and coupled to an outer surface of the inclined surface.

A flange surface 41 may be formed at both ends located at both ends of a length portion of the cross member 2 without a notch.

If the notch is applied to a first flange surface, since the first flange surface in contact with and welded to the side sill 1 is small, there is a disadvantage in that a load transmitted to the cross member 2 is also relatively small. Therefore, it is much preferred that the first flange surface 41 is formed without notches.

The first flange surface 41 may be inclined to correspond to the inclined surface 11 of the inner panel 10 of the side sill 1. The first flange surface may be coupled to the outer surface of the inclined surface of the inner panel by welding such as spot welding, laser welding, or arc welding using carbon dioxide.

The cross member 2 may be provided, for example, as a tubular member having a hollow portion, hollow inside and having a polygonal cross-sectional shape of square or more, but is not necessarily limited thereto, and may be formed of a member formed of a single sheet material having a cross-sectional shape, bent or curved to have an open cross section, or a member obtained by bonding two or more sheet materials.

Figure 4:
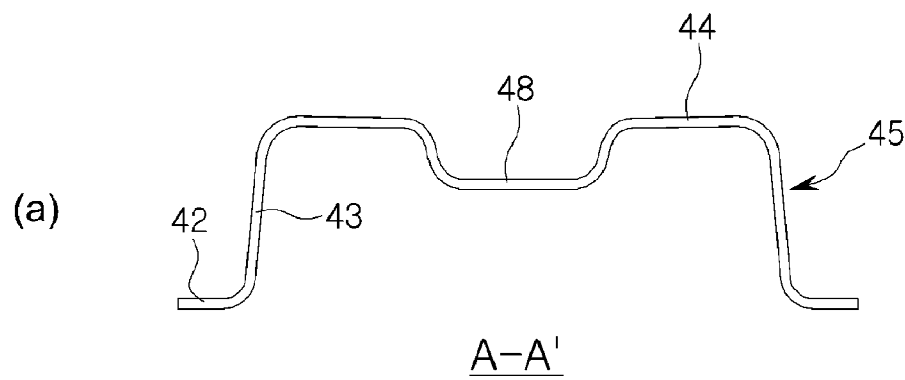
FIG. 4 (*a*) is a cross-sectional view taken along line A-A' of FIG. 3, FIG. 4 (*b*) is a cross-sectional view taken along line B-B', and FIG. 4 (*c*) is a cross-sectional view taken along line C-C'.
Figure 4:
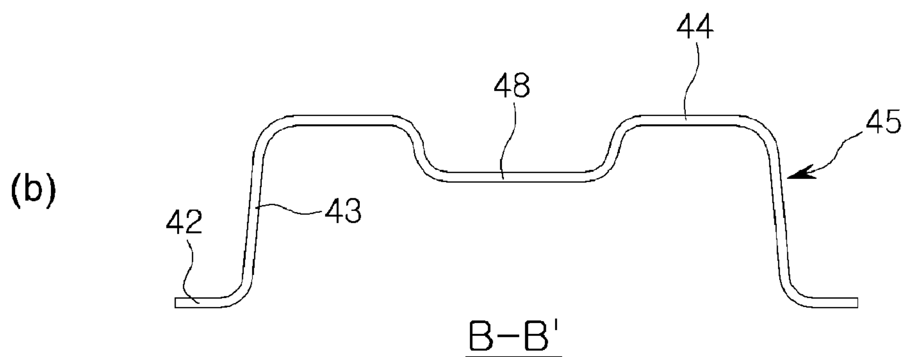
Figure 4:
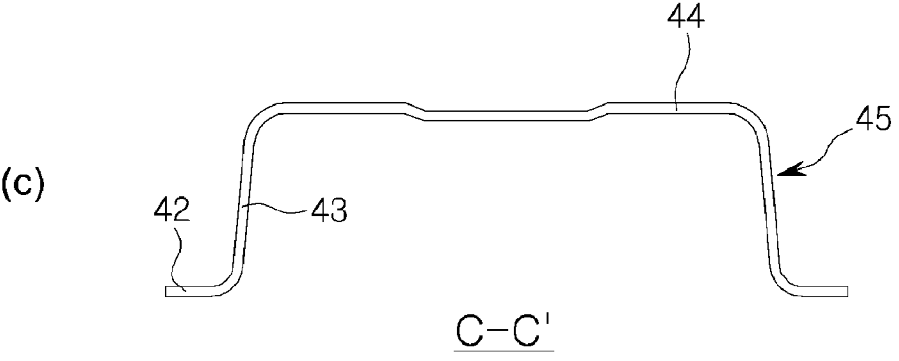

As illustrated in FIGS. 3 and 4, a cross-section of the cross member 2 of the vehicle body according to an embodiment of the present invention includes a pair of wall surfaces 43 extending in a height direction z of the vehicle, and a connection surface 44 connecting one end of the wall surfaces. In addition, the other end of the wall surface may be bent to form a second flange surface 42 for coupling the cross member to a floor panel 3. As a result, the cross member may have a hat-shaped cross-sectional shape.

The cross member 2 may be formed from a single sheet material. For example, by employing a sheet material formed of ultra-high-strength steel of 780 MPa or more, an optimal combination for weight reduction as well as added rigidity may be achieved.

Alternatively, in the cross member 2, an intermediate portion 45 and both ends 46 may be formed of different materials from each other.

The intermediate portion 45 of the cross member 2 may be formed of a sheet material such as 1470 MART steel having a thickness of about 1.5 mm to 1.6 mm produced by the present applicant.

Both ends of the cross member 2 may be formed of a sheet material such as 1180 TRIP steel having a thickness of about 1.8 mm to 1.9 mm or 1470 HPF steel having a thickness of about 1.8 mm to 1.9 mm produced by the present applicant.

As described above, the intermediate portion 45 of the cross member 2 may have strength higher than that of both ends 46 thereof. The intermediate portion of the cross member may have a thickness less than or equal to the thickness of both ends thereof.

The intermediate portion 45 of the cross member 2 may be formed by, for example, roll forming, and both ends 46 may be formed by, for example, press forming. Thereafter, the intermediate portion and both ends may be coupled to each other by welding, to constitute an integral cross member. In FIG. 3, reference numeral 47 denotes a welding line.

Additionally, a bead portion 48 extending in a lengthwise direction of the cross member may be formed on a connection surface 44 of the cross member 2. The bead portion may be formed as a concave channel or a convex protrusion.

A depth or height of the bead portion 48, that is, a depth of the channel or a height of the protrusion may vary, and the depth of the channel may become shallow or the height of the protrusion may decrease toward an end of the cross member 2.

Specifically, in the intermediate portion 45 of the cross member 2, the bead portion 48 formed on the connection surface 44 has a certain depth or height (see FIG. 4 (*a*)).

At the end 46 of the cross member 2, the depth or height of the bead portion 48 vary, and the depth of the channel becomes shallow as a distance from the intermediate portion 45 of the cross member 2 at the end 46 thereof increases, the depth of the channel becomes shallow or the height of the protrusion decreases (see (b) and (c) of FIG. 4).

Accordingly, the connection surface 44 may have an approximately M-shaped cross-sectional shape in the intermediate portion 45 of the cross member 2, and the connection surface is gradually flattened to have a simple hat-shaped cross-sectional shape at both ends 46.

By forming the bead portion 48 as described above, the intermediate portion 45 of the cross member 2 can reinforce rigidity against the collision load exerted in the lengthwise direction of the cross member, and both ends 46 have no bends on the connection surface 44, so that a first flange surface 41 without notches may be easily formed.

Furthermore, as described above, the end portion 46 of the cross member 2 and the first flange surface 41 may be formed to be inclined at an angle (θ) of about 8 to 20 degrees with respect to a vertical line V extending in a height direction Z of the vehicle.

When the angle (θ) of the inclined surface 11 is less than 8 degrees, it is difficult to form the first flange surface 41 at the end 46 of the cross member 2 without a notch, and when the angle (θ) of exceeds 20 degrees, it is not possible to accurately transfer a collision load to the cross member during a side collision of the vehicle, and it is disadvantageous for the reinforcing member 30 or the first reinforcing member 31 to support the collision load.

Accordingly, the end portion 46 of the cross member 2 can have a continuous first flange surface 41 without a notch even though it is formed of ultra-high strength steel of 780 MPa or more.

The inclined first flange surface 41 at the end 46 of the cross member 2 and the inclined surface 11 formed on the inner panel 10 of the side sill 1 are inclined at the same angle θ as each other, so that a contact thereof with each other may be perfectly matched.

As described above, the end 46 of the cross member 2 is in perfect contact with and coupled to the inner panel 10 of the side sill 1, so that the side sill can reliably transfer the collision load to the cross member.

After the cross member 2 is coupled to both side sills 1, it is possible to reduce the weight of the vehicle body while maintaining torsional or bending rigidity of the vehicle body.

The above description is merely an example of the technical idea of the present disclosure, and various modifications and variations can be made to those skilled in the art without departing from the essential characteristics of the present disclosure.

While example embodiments have been shown and described above, it will be apparent to those skilled in the art that modifications and variations could be made without departing from the scope of the present disclosure as defined by the appended claims.

The invention claimed is:

1. A vehicle body, comprising:

a side sill extending in a lengthwise direction of a vehicle; and a cross member extending in a widthwise direction of the vehicle, an end thereof being coupled to the side sill, wherein:

the side sill includes an inner panel;

an outer panel coupled to the inner panel; and a reinforcing member disposed between the inner panel and the outer panel, the inner panel includes an inclined surface formed to have an ascending slope from an inner side to an outer side of the vehicle, an end of the cross member is formed to have a slope corresponding to the inclined surface and is coupled to an outer surface of the inclined surface, one end of the reinforcing member is coupled to an inner surface of the inclined surface, the reinforcing member comprises a first reinforcing member coupled to the inner panel, and a second reinforcing member coupled to the outer panel, one end of the first reinforcing member is coupled to an inner wall of the inclined surface, the first reinforcing member and the second reinforcing member are partially in contact with each other at a plurality of surfaces, and are fixed, a plurality of contact surfaces on which the first reinforcing member and the second reinforcing member are in contact with each other is located at a central portion of the side sill and extends to be parallel to a vertical line extending in the height direction of the vehicle.

2. The vehicle body of claim 1, wherein the inclined surface is inclined at an angle between 8 to 20 degrees with a vertical line extending in a height direction of the vehicle.

3. The vehicle body of claim 1, wherein each of the first reinforcing member and the second reinforcing member is formed by bending a single sheet material.

4. The vehicle body of claim 1, wherein an end of the cross member comprises a first flange surface formed without notches.

5. The vehicle body of claim 4, wherein the first flange surface is inclined at the same angle as the inclined surface, and is coupled to be in contact with an outer surface of the inclined surface.

6. The vehicle body of claim 5, wherein the cross member comprises a pair of wall surfaces extending in a height direction of the vehicle, and a connection surface connecting one end of the pair of wall surfaces, wherein the other end of the wall surface is bent to form a second flange surface.

7. The vehicle body of claim 6, wherein a bead portion formed to extend in a lengthwise direction of the cross member is disposed on the connection surface of the cross member, wherein a depth or height of the bead portion is formed to be variable.

8. The vehicle body of claim 7, wherein an intermediate portion and both ends of the cross member are formed of sheet materials of different materials and then coupled to each other by welding.

9. The vehicle body of claim 8, wherein the intermediate portion of the cross member has a strength equal to or greater than the strength of both ends, and has a thickness less than or equal to the thickness of both ends.

10. The vehicle body of claim 8, wherein in the intermediate portion, the bead portion has a certain depth or height, and at the both ends, the depth of the bead portion becomes shallower or the height of the bead portion becomes lower as the distance thereof from the intermediate portion increases.

11. The vehicle body of claim 1, wherein the side sill and the cross member are made of a sheet material formed of ultra-high strength steel of 780 MPa or more.

* * * * *